United States Patent
Schwarzmann

(10) Patent No.: US 9,626,276 B2
(45) Date of Patent: Apr. 18, 2017

(54) GENERATING A TEST VERSION OF A METHOD TO BE CALLED DURING RUNTIME AND FULFILLING A COLLABORATION CONTRACT

(71) Applicant: Winfried Schwarzmann, Waghäusel (DE)

(72) Inventor: Winfried Schwarzmann, Waghäusel (DE)

(73) Assignee: SAP SE, Walldorf (DE)

( * ) Notice: Subject to any disclaimer, the term of this patent is extended or adjusted under 35 U.S.C. 154(b) by 184 days.

(21) Appl. No.: 14/554,300

(22) Filed: Nov. 26, 2014

(65) Prior Publication Data
US 2016/0147635 A1 May 26, 2016

(51) Int. Cl.
*G06F 11/36* (2006.01)

(52) U.S. Cl.
CPC ...... *G06F 11/3612* (2013.01); *G06F 11/3664* (2013.01); *G06F 11/3684* (2013.01); *G06F 11/3688* (2013.01); *G06F 11/3604* (2013.01); *G06F 11/3668* (2013.01); *G06F 11/3696* (2013.01)

(58) Field of Classification Search
CPC ............. G06F 11/3668; G06F 11/3696; G06F 11/3672; G06F 11/3684; G06F 11/368; G06F 11/3604
See application file for complete search history.

(56) References Cited

U.S. PATENT DOCUMENTS

| | | | | |
|---|---|---|---|---|
| 2005/0125196 A1* | 6/2005 | Swanson | ............. | G06F 11/3684 702/182 |
| 2005/0144593 A1* | 6/2005 | Raghuvir | ............ | G06F 11/3688 717/124 |
| 2005/0283763 A1* | 12/2005 | Fujikawa | ............ | G06F 11/3696 717/124 |
| 2007/0169026 A1* | 7/2007 | Davis | .................. | G06F 11/3672 717/140 |
| 2010/0180257 A1* | 7/2010 | Dern | .................... | G06F 11/3692 717/124 |
| 2012/0084754 A1* | 4/2012 | Ziegler | ............... | G06F 11/3696 717/124 |
| 2015/0220424 A1* | 8/2015 | Yoshida | .............. | G06F 11/3684 714/38.1 |

* cited by examiner

*Primary Examiner* — Joseph Schell
(74) *Attorney, Agent, or Firm* — Mintz Levin Cohn Ferris Glovsky and Popeo, P.C.

(57) ABSTRACT

A method, a system, and a computer program product for generating test infrastructure for testing of software applications are disclosed. At least one first method associated with an application is determined. A testing version of a second method associated with the application is generated. The first method calls a runtime version of the second method during execution of the application in a runtime environment. The first method is tested using the testing version of the second method in a testing environment associated with the application.

15 Claims, 5 Drawing Sheets

FIG. 3.

```
CLASS td_rules DEFINITION INHERITING FROM cl_rules.
  PUBLIC SECTION.
    CLASS-METHODS create_decorator
      RETURNING VALUE(ro_decorator) TYPE REF TO td_rules.       ─── TD_CUT  ── 304
    CLASS-METHODS create_card_never_playable
      RETURNING VALUE(ro_double) TYPE REF TO if_rules_for_player.
    CLASS-METHODS create_card_always_playable                   ─── LTD_DOM ── 306
      RETURNING VALUE(ro_double) TYPE REF TO if_rules_for_player.
    CLASS-METHODS create_spades_cards_playable
      RETURNING VALUE(ro_double) TYPE REF TO if_rules_for_player.
    METHODS if_rules_for_player~determine_playable_cards REDEFINITION. ─── Delegation ── 308
  PRIVATE SECTION.
    DATA mo_rules_for_player TYPE REF TO if_rules_for_player.
    METHODS inject_player_rules                                  ─── Insertion ── 310
      IMPORTING io_rules_for_player TYPE REF TO if_rules.
ENDCLASS.
```
── 302 (class definition), 300 (overall)

```
METHOD if_rules_for_player~determine_playable_cards.              ── 320
  IF mo_rules_for_player IS BOUND.
    mo_rules_for_player->determine_playable_cards( CHANGING ct_hand_card = ct_hand_card ).
  ELSE.
    super->determine_playable_cards( CHANGING ct_hand_card = ct_hand_card ).
  ENDIF.
ENDMETHOD.
```

GENERATING A TEST VERSION OF A METHOD TO BE CALLED DURING RUNTIME AND FULFILLING A COLLABORATION CONTRACT

TECHNICAL FIELD

This disclosure relates generally to data processing and, in particular, to testing of software applications.

BACKGROUND

Many businesses today rely on computer software (e.g., an application, a product, etc.) to perform functions associated with various business purposes. Among multitude of examples, computer software is used to perform record keeping, accounting, payroll, management, customer service, purchasing, website creation, maintenance, etc., as well as many other functions. The software is used in many technology fields, which include medical, financial, educational, and/or any other fields. Proper operation of software is sometimes essential to successful operation of a business, whereas faulty operation can be disastrous.

To ensure that computer software operates properly, software is tested prior to being delivered to its intended user (e.g., an individual user, a business entity, etc.). Testing of software can provide information about quality of the software product being tested as well as identify risks of software implementation. Testing of software can include execution of a program and/or an application with the intent of finding software bugs, errors and/or any other defects. In other words, software testing can perform validation and/or verification that computer software meets requirements of its design and development, works as expected, can be implemented with the same characteristics, etc.

In some cases, software can be tested automatically and can provide instantaneous feedback to its developers whether or not they introduced a bug, an error, etc. in the course of their work. The automated testing can also reduce efforts associated with manual testing. As stated above, testing can be performed using a specific test code, program, application, etc., which can implement various test scenarios and can serve as a living documentation what a particular software component can offer and how it can be used. Although automated testing can be effective over time (e.g., by requiring less maintenance), however, it can entail a significant extra effort during development. In view of that, test code development can potentially be skipped, such as for example, when developers are under pressure to finalize the product and/or send it to a customer. Thus, there is a need to create a more efficient way to test computer software automatically.

SUMMARY

In some implementations, the current subject matter relates to a computer implemented method for testing of software applications. The method can include determining at least one first method associated with an application, generating a testing version of a second method associated with the application, the first method calling a runtime version of the second method during execution of the application in a runtime environment, and testing the at least one first method using the testing version of the second method in a testing environment associated with the application. At least one of the determining, the generating, and the testing can be performed by at least one processor of at least one computing system.

In some implementations, the current subject matter can include one or more of the following optional features. The second method can define a collaboration contract. The runtime version of the second method and the testing version of the second method can fulfill the collaboration contract. At least one first method can call at least one of the testing version of the second method and the runtime version of the second method based on the collaboration contract.

In some implementations, at least one first class can include at least one first method and can define a variable for referring to an object which at least one first method uses to call the second method. The variable can represent at least one of the following: an attribute of the first class and a parameter of the at least one first method. At least one second class can include the runtime version of the second method. The generating can further include at least one of the following: defining at least one decorator class as a subclass of at least one second class, the decorator class can include an attribute for referring to an object with one of the testing version and the runtime version of the second method; defining at least one double class including the testing version of the second method; and redefining the second method of at least one decorator class to define a conditional call of the second method on the object referred to by the attribute of the at least one decorator class, the condition can indicate that the attribute of at least one decorator class contains a valid object reference.

In some implementations, the method can further include determining whether at least one first class and at least one second class are the same; and testing at least one first method on an object of at least one decorator class, wherein the testing environment assigns the object of at least one double class to an attribute of an object of at least one decorator class before invoking at least one first method.

In some implementations, the method can further include determining whether at least one second class and at least one first class are different; and testing at least one first method on an object of at least one first class, wherein the testing environment assigns the object of at least one double class to an attribute of an object of at least one decorator class and assigns the object of at least one decorator class to the variable of the first class object. In this case, the generating of the testing version can further include defining a subset of a plurality of methods of at least one second class; defining at least one decorator class with a separate attribute for each method in the subset of the plurality of methods; and associating at least one double class with each method in the subset of the plurality of methods. The testing environment can assign for each method in the subset of the plurality of methods an object of the at least one associated double class to its attribute before testing the at least one first method.

In some implementations, the method can further include generating of a new testing version of the second method. The generating of the new testing method can be performed upon changing of the collaboration contract of the second method. Here, the generating can include defining a subset of a plurality of methods of at least one second class, defining at least one decorator class with a separate attribute for each method in the subset of the plurality of methods; and associating at least one double class with each method in the subset of the plurality of methods. The testing environment can assign for each method in the subset of the plurality of methods an object of at least one associated double class to its attribute before testing at least one first method.

In some implementations, the generating of the testing version can preserve at least one implementation of the testing version of the second method.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 illustrates an extract of exemplary definition and implementation of a decorator class as result of an exemplary test infrastructure generation for a software application, according to some implementations of the current subject matter;

DETAILED DESCRIPTION

To address these and potentially other deficiencies of currently available solutions, one or more implementations of the current subject matter provide methods, systems, articles or manufacture, and the like that can, among other possible advantages, provide systems and methods for performing code testing of a computer software.

In some implementations, the current subject matter can perform testing of a software application by determining at least one first method associated with the software application, and generating a testing version of a second method associated with the application. The first method can call a runtime version of the second method during execution of the software application in a runtime environment. The current subject matter can then perform testing of the first method using a testing version of the second method in a testing environment associated with the software application.

Figure 1:
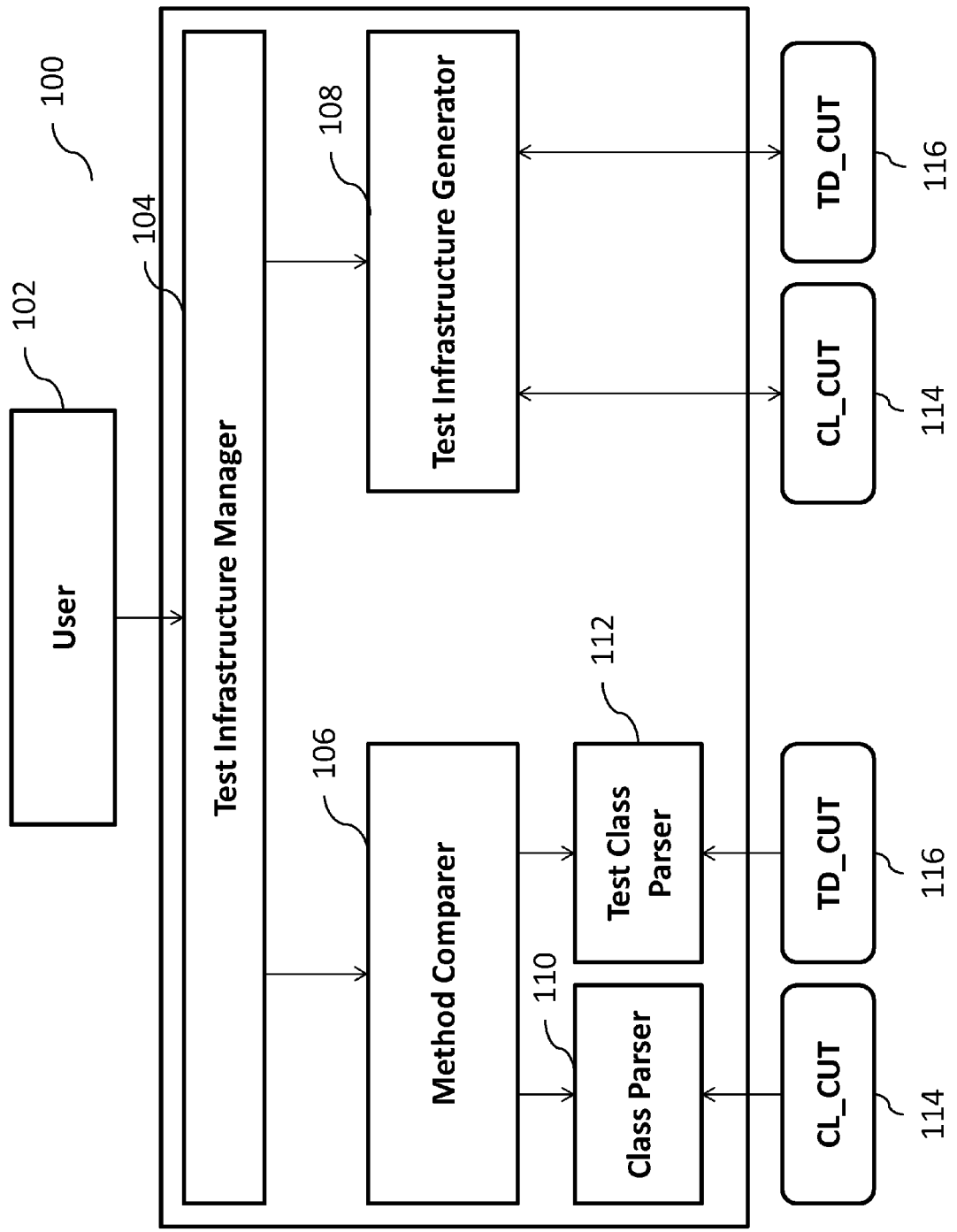
FIG. 1 illustrates an exemplary system for generating test infrastructure for performing code testing, according to some implementations of the current subject matter.

FIG. 1 illustrates an exemplary system 100 for generating test infrastructure for performing testing of a software application, according to some implementations of the current subject matter. The system 100 can include a test infrastructure manager module 104 that can communicate with a user 102, a method comparer module 106, and a test infrastructure generator module 108. The method comparer module 106 can communicate with a class parser module 110 and a test class parser module 112. The system 100 can be implemented using one or more computing systems that can include at least one processor and at least one memory, where the memory can store at least one instruction that can be executed on the processor. The computing system can include software, hardware and/or a combination of software and hardware.

In some implementations, the system 100 can generate infrastructure to support definition and implementation of unit tests. Unit testing is a software testing method by which individual units of source code, sets of one or more computer program modules together with associated control data, usage procedures, and/or operating procedures can be tested. Such testing can be used to determine whether the software application is operative, appropriately fit for a particular use, etc. A unit can be the smallest testable part of the software application. In procedural programming, a unit can be an entire module. In object-oriented programming, a unit can be a class. It can also be an individual method. In some implementations, an interface can offer/define a "collaboration contract" for methods that it includes. A class implementing this interface can provide an implementation for these methods, which fulfill the contract the interface offers/defines. If a collaborating class depends only on the interface, and not on the class it implements, then this class can be replaced by any other class implementing this interface without breaking this collaboration contract. This can be used in unit tests, where double classes replace productive classes in test scenarios. Unit tests can be short code segments that can be created by developers during development. A unit test can target an instance of a "class under test" ("CUT") by calling one of its methods in a specific way to ensure that this method works as designed/expected.

For object-oriented programming languages, a test code can include a plurality of test classes that can include a plurality of test methods. Each test method can call a method of a production class and can verify its behavior under at least one predefined condition. For unit testing, a class under test might have to be tested in isolation from the remaining code. This can mean that if a method under test ("MUT") is calling another depended-on method ("DOM"), then the behavior of DOM can be doubled and/or mocked (and/or copied, imitated, etc.) to eliminate any side effects by DOM on the test result. Thus, a test method calling MUT can fail if and only if there is an error (or a bug, etc.) in the MUT.

If M is another method of CUT, then the current subject matter can achieve this isolation by testing a double of the class under test ("CUT_DOUBLE"). As a subclass of CUT it can redefine an implementation of this method M (e.g., just constant values can be returned to keep MUT going). If M is a method of another depended-on class ("DOC"), then the current subject matter can generate a corresponding depended-on class double ("DOC_DOUBLE") that can be made available to the CUT object before its method MUT is executed on it. This procedure can be referred to as an injection.

In some implementations, the current subject matter can support a unit test developer in generating one or more and/or portions of the above double classes and/or test classes based on the signature of the class under test and classes it depends on. This can allow a test developer to focus on an implementation of the test methods (i.e., the actual test logic) and the corresponding implementation of the test double methods (i.e. the actual behavior of the mocks). In some implementations, the current subject matter can further support test-driven development as it can allow repeated generation of the same test infrastructure for CUT during its development/maintenance. This means that developed test code (mainly test double implementations) can be preserved unless the corresponding production method was deleted (i.e., not only renamed).

Figure 2:
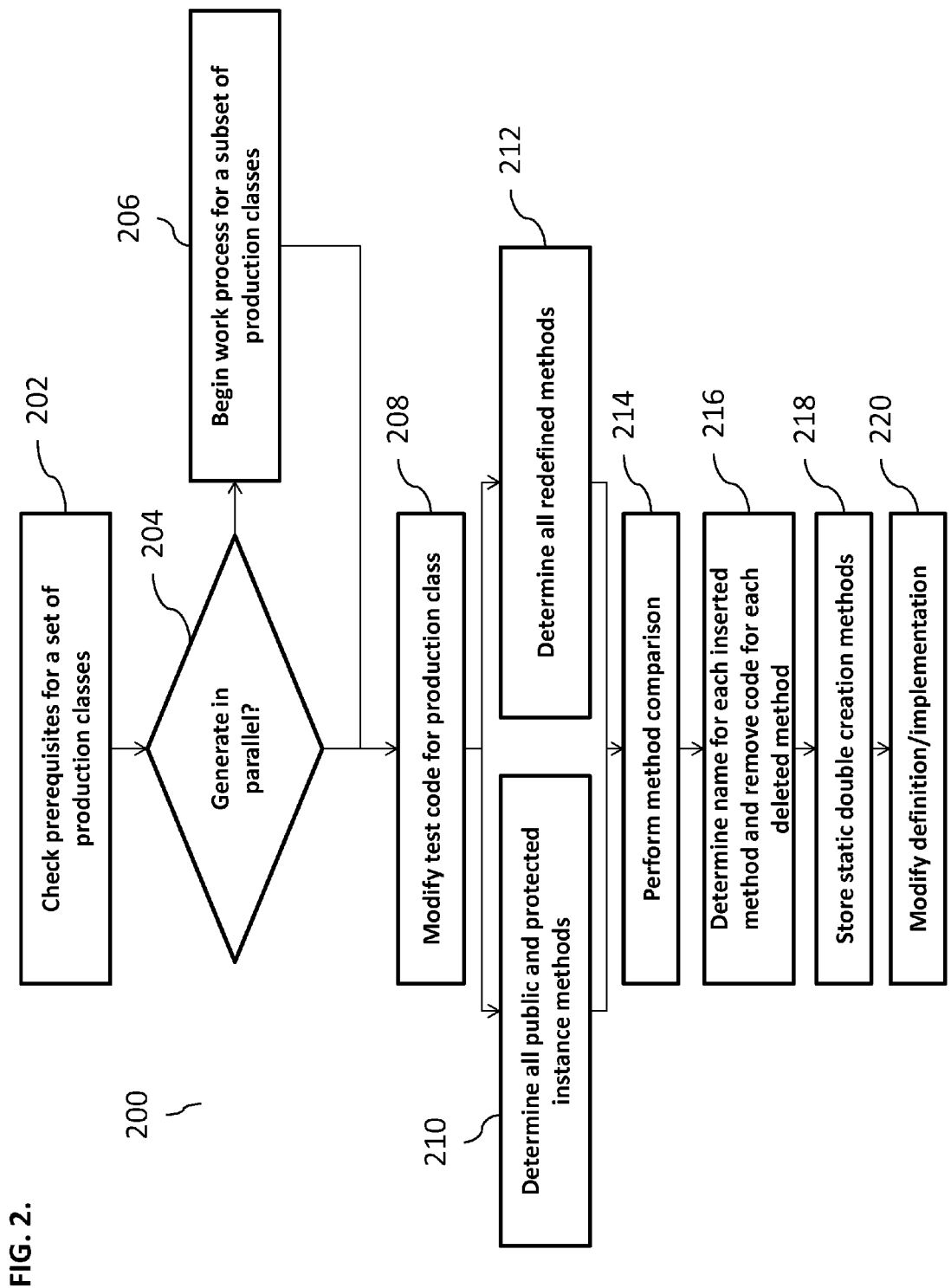
FIG. 2 is a flowchart illustrating an exemplary process for generating test infrastructure for performing code testing, according to some implementations of the current subject matter.

Referring back to FIG. 1, upon determination of a specific production class (and/or other unit of a software application) for testing, referred to as CL_CUT 114, the test infrastructure manager module 104 can identify and/or check prerequisites for it. Such checking can ensure that CL_CUT is not declared final, instantiation is not private, and that all to be mocked methods do not have private visibility. As will be discussed below, FIG. 2 illustrates parallelization, because generation of CL_CUT1 can be independent of the generation of CL_CUT2. In general, developers can change multiple classes for a feature/correction. Thus, in some implementations, the current subject matter can allow multiple classes as input. By way of illustration only, FIG. 1 shows what is relevant for a single class CL_CUT.

In some implementations, for CL_CUT a decorator class TD_CUT 116 can be generated. Further, for multiple public/protected methods of CL_CUT, testing versions can be generated as methods in one and/or multiple double classes. For a production method METH of CL_CUT, at least one double class LTD_METH can be generated. The LTD_METH can either inherit from CL_CUT and provide a testing version as a redefinition of METH or it can implement the interface of METH with that testing version. In some implementations, these double classes can be generated as local classes of TD_CUT. In this case, TD_CUT can provide at least one public method for creating LTD_METH instances (for example, as shown at 306 in FIG. 3, and discussed below). In some implementations, the partial definition of a local unit test class LTC_METH for each public method METH of CL_CUT can be generated (e.g., local to CL_CUT). This way a unit test developer can focus on an implementation of the test methods (belonging to LTC_METH) and the test double methods (belonging to LTD_METH) which together define the test run (i.e. test case or test logic).

The test infrastructure generator module 108 can create TD_CUT (if it does not exist already). Further, if not already done during development/maintenance of CL_CUT, it can also adapt the test code and test infrastructure so that it is syntactically synchronized with a current definition of CL_CUT.

The test infrastructure manager module 104 can handover CL_CUT and TD_CUT (if it already exists from a previous generation) to the method comparer module 106, which in turns hands over CL_CUT to the class parser module 110 and an existing TD_CUT to the test class parser module 112.

The class parser module 110 can determine T_METH_CL as the list of all public and protected instance methods of CL_CUT 114. T_METH_CL can include at least the parameter list and the exception list for each contained method.

The test class parser module 112 can determine T_METH_TD as the list of all methods redefined by TD_CUT 116. T_METH_TD represents all methods METH which can be mocked with TD_CUT so far. Further, the test class parser module 112 can determine T_CREATE_LTD as the list of all double creation methods offered by TD_CUT so far. T_CREATE_LTD represents in which different ways METH can be mocked so far.

Based on the output T_METH_CL of the class parser module 110 and the output T_METH_TD of the test class parser module 112, the method comparer module 106 can ascertain T_INS_METH, T_UPD_METH, and T_DEL_METH, and determine which method needs to be inserted into, updated in, and deleted from the test infrastructure, respectively. The renaming of method METH from METH_OLD to METH_NEW can result in METH_OLD being included in T_DEL_METH and METH_NEW being included in T_INS_METH. With that result from the method comparer module 106, the test infrastructure manager 104 can resolve any conflicts that may have occurred since the last generation. Further, it can update T_CREATE_LTD by removing all creation methods from that list which relate to methods in T_DEL_METH and inserting a first creation method into that list for each method in T_INS_METH (developers can create further ones, e.g. by copying and adapting that first one).

It can be required that test code is highly readable. Since the behavior of an involved test double can be decisive for the test logic, its creation can add to the overall readability. That is, the name of the TD_CUT method with which it is created can be well-chosen in the sense that it can self-document the mocked behavior to the greatest possible extent. On the other side, the various TD_CUT create methods for mocking a particular CL_CUT method can build a group of alternatives. The test infrastructure manager can support the user 102 at least in fulfilling the latter respect, e.g., by proposing and administrating an acronym (e.g. 3 letters) for each such group. Further, it can offer a process in which the user 102 can decide for each method in T_DEL_METH whether the corresponding (generated and/or edited code) test code shall be automatically removed or merely deactivated (e.g. with comments).

Then, a test class generator module can perform modification of definitions and implementations of TD_CUT 116 and its local method-specific double classes LTD_METH. Further, it can modify local method-specific unit test classes LTC_METH of CL_CUT 114. This can be done for one or more methods in T_UPD_METH and T_INS_METH.

FIG. 2 is a flowchart illustrating an exemplary process 200 for generating a test infrastructure for automatic testing of a software application, according to some implementations of the current subject matter. At 202, a check of the prerequisites for a set of production classes can be performed. This can be performed by an instance of the test infrastructure manager module 102 (shown in FIG. 1), and can include parts of the definition of the production classes preventing inheritance or redefinition of methods. Prerequisite violations can be presented to the user 102 (shown in FIG. 1) and user's decisions to resolve them can be stored. At 204, a determination can be made whether several subsets of production classes are to be processed in parallel. If so, then, at 206, multiple work processes can be started, each working with a separate instance of the test infrastructure manager on such subset of production classes. In this case, the decisions can be stored in the beginning of the process and the processing proceeds without any additional interaction from the user. Otherwise, the processing proceeds to 208. For the ease of understanding, FIG. 2 shows a remainder of the work process performed for a subset with a single production class. At 208, code modification for a production class can be performed by the test infrastructure manager 104 (shown in FIG. 1), and can include at least the stored decisions of the user. Once the code is modified, a determination of all public and protected instance methods T_METH_CL can be performed. This can be accomplished using the class parser module 110 (shown in FIG. 1). Further, if a decorator class TD_CUT already exists, a determination of all its redefined methods T_METH_TD can be performed as well, at 212. This can be accomplished using the test class parser module 112 (shown in FIG. 1). At 214, a method comparer module 106 can perform a comparison of the method list T_METH_CL and T_METH_TD. This can result in determination of the method lists T_METH_INS (new or renamed methods, which are in CL_CUT, but not in TD_CUT), T_METH_UPD (old methods, which parameter lists and/or exception list are different between CL_CUT and TD_CUT), and T_METH_DEL (old methods, which are no longer in CL_CUT, but still in TD_CUT).

The processing then proceeds to 216. At 216, the user can determine names for new artefacts of the test infrastructure related to inserted CL_CUT methods and decide upon removal/deactivation of any code related to any deleted CL_CUT methods. Among others, the test class parser can store creation methods for the double classes, at 218. At 220, any definitions and/or implementations of the decorator class and its local method-specific double classes as well as the local method-specific unit test classes of the class under test can be appropriately modified.

FIG. 3 illustrates an exemplary test code 300 for testing a unit of a software application relating to a card game, according to some implementations of the current subject matter. The code 300 can include a section 302 defining the decorator class td_rules as subclass of the production class cl_rules. The code can have a public section ("PUBLIC SECTION") including code sections 304, 306, and 308 and a private section ("PRIVATE SECTION") including code section 310. With the method definition in code section 304, an instance of the decorator class TD_CUT can be created. With each method definition in code section 306, an instance of a method-specific double class LTD_DOM can be created. The double classes LTD_DOM can be defined locally in the class TD_CUT in order to keep the number of globally defined classes for testing purposes to a minimum. Each double class instance which is returned by a create method in 306 simulates (mocks) a logic which can determine for given cards which ones are playable (in a particular state of the card game). In detail, the first creation method can simulate that none of the given cards is playable (i.e., "card never playable"), the second method can simulate that every card is playable (i.e., "card always playable"), and the third method can simulate that exclusively spades cards are playable (i.e., "spades cards playable"). Further, the public section can include a redefinition of CL_CUT methods by TD_CUT in order to delegate a method call from the decorator class instance to a double class instance if the testing environment assigned (injected) that one to the decorator class attribute "MO_RULES_FOR_PLAYER", and to delegate it to the inherited instance of the super class CL_CUT otherwise. In section 320, the implementation of this redefinition of the method "determine playable cards" is shown. The private section can include code section 310 that can be used, for example, to perform the injection of a method-specific double instance into a decorator class instance which is decisive for the behavior of code 320 as pointed out above. In this example, injection is performed by a friend class of TD_RULES. In other implementations, the injection method is public so that every test class can perform the injection itself.

In some implementations, the current subject matter can provide a high readability to test code readers by stating the creation and injection of a double class instance as follows: TD_RULES=>INJECT_PLAYER_RULES (TD_RULES=>CREATE_CARD_NEVER_PLAYABLE( )). If necessary it can also provide orchestration of independently injected double class instances by creating each of them with a reference to a logic/data base which represents the required single source of truth. For example, multiple mocked methods can provide different views on the same data. The test environment can create and store this data in a single fake DB instance, which it hands over to the double class instances when creating them (the respective create method definition in code section 306 merely needs a corresponding importing parameter for this fake DB instance). Further, the current subject matter can generate method-specific test classes to enhance readability of test methods. Such a test class with focus on a single MUT can have attributes for all importing and exporting parameters of MUT and at least one help method which realizes a MUT call with these attributes. The test methods no longer call MUT directly with locally defined and prepared variables, but can call it indirectly with one of these help methods without any local variable definitions (and possibly also without much preparation because the used test class attributes can at least partly be prepared in the test class setup method). This reduces the statements in the test methods to the pure test logic which enhances their readability a lot. As mentioned above, the current subject matter can generate such method-specific test classes with such attributes and a first such help methods, too. In some implementations, the current subject matter can further support large scale test isolation. If the method under test depends directly or indirectly on the methods DOM(1), DOM(2) . . . , and if for DOM(x) there are multiple different mocking behaviors of interest, then the current subject matter can support the testing of the combinatory of test cases.

Figure 4:
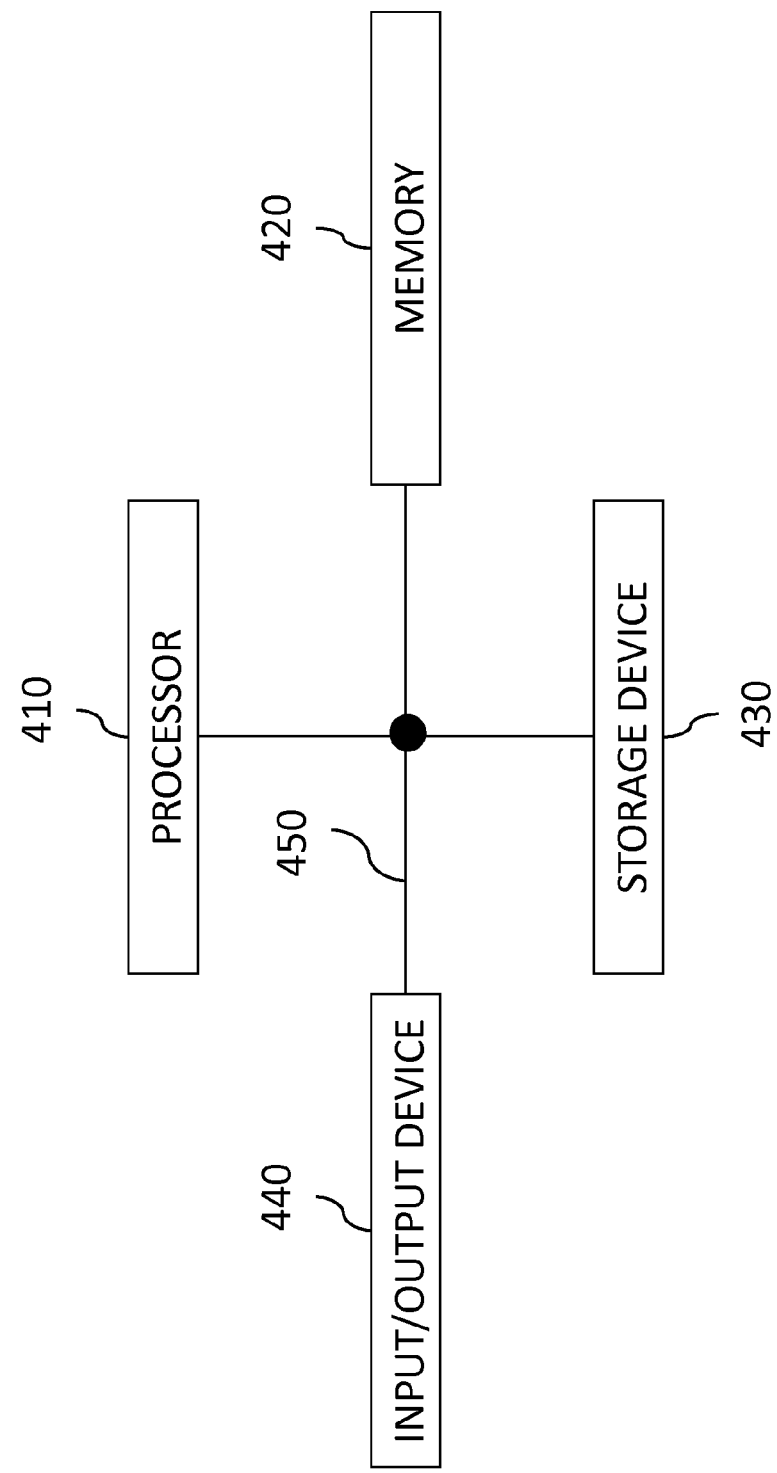
FIG. 4 is an exemplary system that can be used for performing testing using a test infrastructure generation, according to some implementations of the current subject matter.

In some implementations, the current subject matter can be configured to be implemented in a system 400, as shown in FIG. 4. The system 400 can include a processor 410, a memory 420, a storage device 430, and an input/output device 440. Each of the components 410, 420, 430 and 440 can be interconnected using a system bus 450. The processor 410 can be configured to process instructions for execution within the system 400. In some implementations, the processor 410 can be a single-threaded processor. In alternate implementations, the processor 410 can be a multi-threaded processor. The processor 410 can be further configured to process instructions stored in the memory 420 or on the storage device 430, including receiving or sending information through the input/output device 440. The memory 420 can store information within the system 400. In some implementations, the memory 420 can be a computer-readable medium. In alternate implementations, the memory 420 can be a volatile memory unit. In yet some implementations, the memory 420 can be a non-volatile memory unit. The storage device 430 can be capable of providing mass storage for the system 400. In some implementations, the storage device 430 can be a computer-readable medium. In alternate implementations, the storage device 430 can be a floppy disk device, a hard disk device, an optical disk device, a tape device, non-volatile solid state memory, or any other type of storage device. The input/output device 440 can be configured to provide input/output operations for the system 400. In some implementations, the input/output device 440 can include a keyboard and/or pointing device. In alternate implementations, the input/output device 440 can include a display unit for displaying graphical user interfaces.

Figure 5:
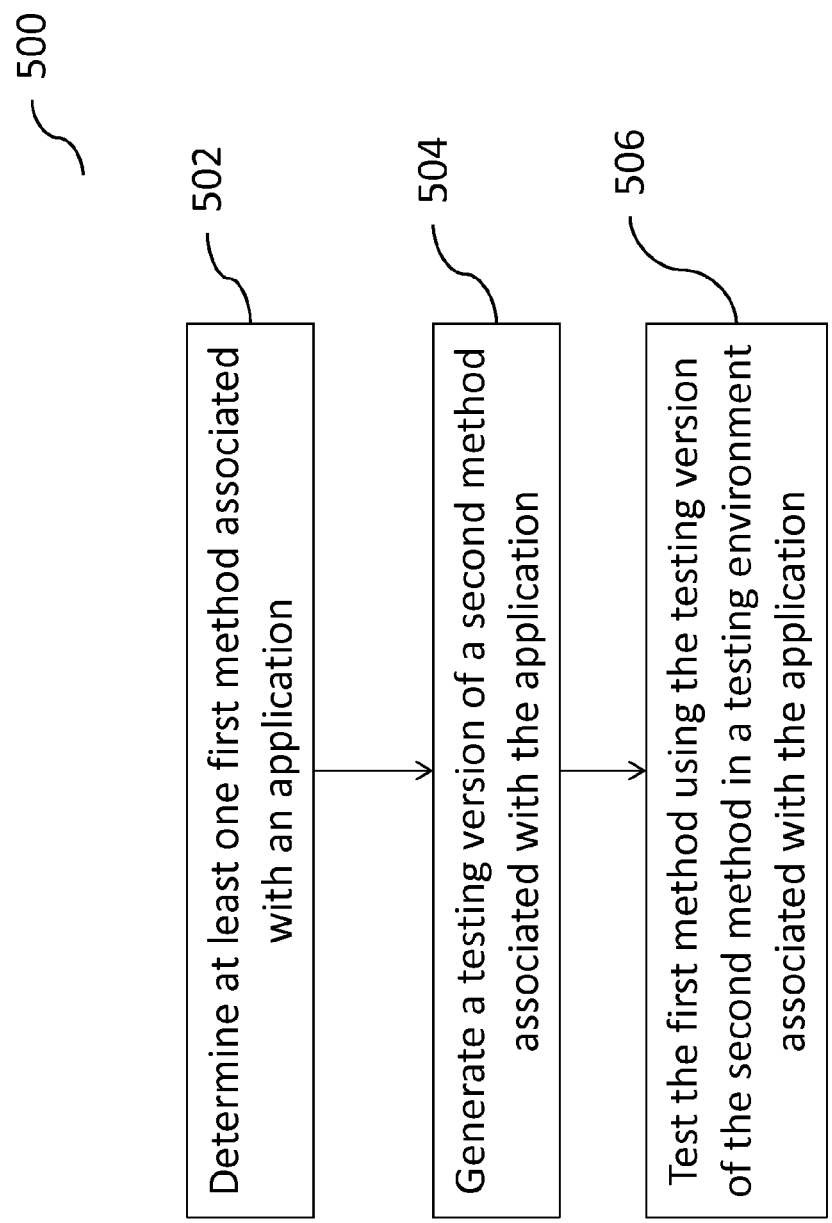
FIG. 5 is an exemplary method for performing an efficient automated testing using a test infrastructure generation, according to some implementations of the current subject matter.

FIG. 5 illustrates an exemplary method 500 for generating test infrastructure for performing testing of a software application, according to some implementations of the current subject matter. At 502, at least one first method associated with a software application can be determined for testing. At 504, a testing version of a second method associated with the software application can be generated. The first method can call a runtime version of the second method during execution of the software application in a runtime environment. At 506, the first method can be tested using the testing version of the second method in a testing environment associated with the application.

In some implementations, the current subject matter can include one or more of the following optional features. In some implementations, the second method can define a collaboration contract. The runtime version of the second method and the testing version of the second method can fulfill this collaboration contract. The collaboration contract can be fulfilled in different ways by the versions of the second method. The first method can call at least one of the testing version of the second method and the runtime version of the second method based on the collaboration contract. The first method can call the versions of the second method exclusively based on the collaboration contract.

In some implementations, the first class can include the first method. The first class can define a variable for referring to an object which the first method uses to call the second method. The variable can include or be of the following: an attribute of the first class or a parameter of the first method. In both cases, the first method can access this variable. The second class can include the runtime version of the second method. The generation of the testing version can further include at least one of the following: defining at least one decorator class as a subclass of the second class, where the decorator class can include an attribute for referring to an object with either the testing version or the runtime version of the second method, defining at least one double class including the testing version of the second method, and redefining the second method of the decorator class to define a conditional call of the second method on the object referred to by the attribute of the at least one decorator class. The condition can indicate that the attribute of the decorator class contains a valid object reference.

In some implementations, the method can further include determining whether the first class and the second class are the same (i.e., the first class includes both the first method and the second method), and testing the first method on an object of the decorator class, where the testing environment assigns the object of the double class to an attribute of an object of the decorator class before invoking the first method.

In some implementations, the method can further include determining whether the second class and the first class are different, and testing the first method on an object of the first class, where the testing environment assigns the object of the double class to an attribute of an object of the decorator class and assigns the object of the decorator class to the variable of the first class.

In some implementations, the method can also include generating a new testing version of the second method. This can be performed upon changing of the collaboration contract of the second method. In some implementations, the decorator class and the double classes can be regenerated. Regeneration can be started manually or automatically. The change of the collaboration contract of the second method can include at least one of the following: inserting, changing and/or deleting a parameter; changing which exceptions the second method declares (which it may throw to indicate an error or the like), and/or changing the name of the method. The last option is also a change of the collaboration contract although it does not represent a change of the behavior of any version of the second method.

In some implementations, the generation of the testing version can include defining a subset of a plurality of methods of the second class, defining the decorator class with a separate attribute for each method in the subset of the plurality of methods, and associating at least one double class with each method in the subset of the plurality of methods. Multiple methods may have the same double class if the double class includes implementations for multiple methods. On the other hand, different double classes may be required for the same method if this method has more parameters than this is acceptable for a double instance (from a simplicity point of view). In this case double classes with constant values for at least some of the parameters make sense to enhance the readability of the double creation statements. Thus, the generation of the testing version may result in both multiple double classes for a single method as well as the same double class for multiple methods. In some cases, the generation can result in a one-to-one correspondence, where all other associations can be defined by customizing at design time and/or by a user/using application at runtime of the generation. Further, the testing environment can assign for each method in the subset of the plurality of methods an object of the associated double class to its attribute before testing the first method.

In some implementations, the generating of the testing version can preserve at least one implementation of the testing version of the second method. This avoids that the developer has to provide these implementations again.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer implemented method, comprising:
   determining at least one first method associated with an application;
   generating a testing version of a second method associated with the application, the first method calling a runtime version of the second method during execution of the application in a runtime environment;
   testing the at least one first method using the testing version of the second method in a testing environment associated with the application; and
   generating a new testing version of the second method, the generating of the new testing version is performed upon changing of a collaboration contract of the second method, wherein the second method defines the collaboration contract, the runtime version of the second method and the testing version of the second method fulfilling the collaboration contract, and the at least one first method calls at least one of the testing version of the second method and the runtime version of the second method based on the collaboration contract;
   wherein at least one of the determining, the generating the testing version, the testing, and the generating the new testing version is performed by at least one processor of at least one computing system.

2. The method according to claim 1, wherein
at least one first class includes the at least one first method and defines a variable for referring to an object which the at least one first method uses to call the second method, wherein the variable represents at least one of the following: an attribute of the first class and a parameter of the at least one first method;
at least one second class includes the runtime version of the second method, wherein the generating includes at least one of the following:
defining at least one decorator class as a subclass of the at least one second class, the at least one decorator class including an attribute for referring to an object with one of the testing version and the runtime version of the second method;
defining at least one double class including the testing version of the second method; and
redefining the second method of at least one decorator class to define a conditional call of the second method on the object referred to by the attribute of the at least one decorator class, the condition indicating that the attribute of the at least one decorator class contains a valid object reference.

3. The method according to claim 2, further comprising
determining whether the at least one first class and the at least one second class are the same; and
testing the at least one first method on an object of the at least one decorator class, wherein the testing environment assigns the object of the at least one double class to an attribute of an object of the at least one decorator class before invoking the at least one first method.

4. The method according to claim 2, further comprising
determining whether the at least one second class and the at least one first class are different; and
testing the at least one first method on an object of the at least one first class, wherein the testing environment assigns the object of the at least one double class to an attribute of an object of the at least one decorator class and assigns the object of the at least one decorator class to the variable of the first class object.

5. The method according to claim 4, wherein the generating further comprises
defining a subset of a plurality of methods of the at least one second class;
defining the at least one decorator class with a separate attribute for each method in the subset of the plurality of methods; and
associating at least one double class with each method in the subset of the plurality of methods;
wherein the testing environment assigns for each method in the subset of the plurality of methods an object of the at least one associated double class to its attribute before testing the at least one first method.

6. The method according to claim 1, wherein the generating the testing version further comprises
defining a subset of a plurality of methods of the at least one second class;
defining at least one decorator class with a separate attribute for each method in the subset of the plurality of methods; and
associating at least one double class with each method in the subset of the plurality of methods;
wherein the testing environment assigns for each method in the subset of the plurality of methods an object of the at least one associated double class to its attribute before testing the at least one first method.

7. The method according to claim 1, wherein the generating preserves at least one implementation of the testing version of the second method.

8. A system comprising:
at least one programmable processor; and
a machine-readable medium storing instructions that, when executed by the at least one programmable processor, cause the at least one programmable processor to perform operations comprising:
determining at least one first method associated with an application;
generating a testing version of a second method associated with the application, the first method calling a runtime version of the second method during execution of the application in a runtime environment;
testing the at least one first method using the testing version of the second method in a testing environment associated with the application; and
generating a new testing version of the second method, the generating of the new testing version is performed upon changing of a collaboration contract of the second method, wherein the second method defines the collaboration contract, the runtime version of the second method and the testing version of the second method fulfilling the collaboration contract, and the at least one first method calls at least one of the testing version of the second method and the runtime version of the second method based on the collaboration contract.

9. The system according to claim 8, wherein
at least one first class includes the at least one first method and defines a variable for referring to an object which the at least one first method uses to call the second method, wherein the variable represents at least one of the following: an attribute of the first class and a parameter of the at least one first method;
at least one second class includes the runtime version of the second method, wherein the generating includes at least one of the following:
defining at least one decorator class as a subclass of the at least one second class, the at least one decorator class including an attribute for referring to an object with one of the testing version and the runtime version of the second method;
defining at least one double class including the testing version of the second method; and
redefining the second method of at least one decorator class to define a conditional call of the second method on the object referred to by the attribute of the at least one decorator class, the condition indicating that the attribute of the at least one decorator class contains a valid object reference.

10. The system according to claim 9, wherein the operations further comprise
determining whether the at least one first class and the at least one second class are the same; and
testing the at least one first method on an object of the at least one decorator class, wherein the testing environment assigns the object of the at least one double class to an attribute of an object of the at least one decorator class before invoking the at least one first method.

11. The system according to claim 9, wherein the operations further comprise
determining whether the at least one second class and the at least one first class are different; and testing the at least one first method on an object of the at least one first class, wherein the testing environment assigns the object of the at least one double class to an attribute of an object of the at least one decorator class and assigns the object of the at least one decorator class to the variable of the first class object.

12. The system according to claim 11, wherein the generating further comprises defining a subset of a plurality of methods of the at least one second class;

defining the at least one decorator class with a separate attribute for each method in the subset of the plurality of methods; and associating at least one double class with each method in the subset of the plurality of methods;

wherein the testing environment assigns for each method in the subset of the plurality of methods an object of the at least one associated double class to its attribute before testing the at least one first method.

13. The system according to claim 8, wherein the generating the testing version further comprises defining a subset of a plurality of methods of the at least one second class;

defining at least one decorator class with a separate attribute for each method in the subset of the plurality of methods; and associating at least one double class with each method in the subset of the plurality of methods;

wherein the testing environment assigns for each method in the subset of the plurality of methods an object of the at least one associated double class to its attribute before testing the at least one first method.

14. The system according to claim 8, wherein the generating preserves at least one implementation of the testing version of the second method.

15. A computer program product comprising a non-transitory machine-readable medium storing instructions that, when executed by at least one programmable processor, cause the at least one programmable processor to perform operations comprising:

determining at least one first method associated with an application;

generating a testing version of a second method associated with the application, the first method calling a runtime version of the second method during execution of the application in a runtime environment;

testing the at least one first method using the testing version of the second method in a testing environment associated with the application; and generating a new testing version of the second method, the generating of the new testing version is performed upon changing of a collaboration contract of the second method, wherein the second method defines the collaboration contract, the runtime version of the second method and the testing version of the second method fulfilling the collaboration contract, and the at least one first method calls at least one of the testing version of the second method and the runtime version of the second method based on the collaboration contract.

* * * * *